(12) United States Patent
Servin et al.

(10) Patent No.: US 11,927,259 B2
(45) Date of Patent: Mar. 12, 2024

(54) HOUSING FOR MECHANICAL DEVICE, MECHANICAL ASSEMBLY, GEAR MOTOR AND ASSOCIATED ATTACHMENT METHOD

(71) Applicant: Valeo Systèmes d'Essuyage, Le Mesnil Saint Denis (FR)

(72) Inventors: Alain Servin, Le Mesnil Saint Denis (FR); Jean-Michel Berthome, Le Mesnil Saint Denis (FR); Quentin Aubugeau, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/918,638

(22) PCT Filed: Mar. 29, 2021

(86) PCT No.: PCT/EP2021/058214
§ 371 (c)(1),
(2) Date: Oct. 13, 2022

(87) PCT Pub. No.: WO2021/209253
PCT Pub. Date: Oct. 21, 2021

(65) Prior Publication Data
US 2023/0146572 A1 May 11, 2023

(30) Foreign Application Priority Data
Apr. 13, 2020 (FR) ...................... 2003685

(51) Int. Cl.
*F16H 57/021* (2012.01)
*B60S 1/08* (2006.01)
(Continued)

(52) U.S. Cl.
CPC .............. *F16H 57/021* (2013.01); *B60S 1/08* (2013.01); *B60S 1/26* (2013.01);
(Continued)

(58) Field of Classification Search
CPC ......... F16H 57/021; F16H 2057/02017; F16H 2057/02034; F16H 2057/02082; B60S 1/26; B60S 1/166
See application file for complete search history.

(56) References Cited

U.S. PATENT DOCUMENTS 1,677,175 A * 7/1928 Doman .................... H02K 7/06
15/250.3
5,634,726 A * 6/1997 Edele ...................... F16C 35/02
15/250.31
(Continued)

FOREIGN PATENT DOCUMENTS

DE 102015122094 A1 6/2017
EP 0635651 A1 1/1995
(Continued)

OTHER PUBLICATIONS

International Search Report and Written Opinion in corresponding International Application No. PCT/EP2021/058214, dated Jun. 9, 2021 (12 pages).
(Continued)

*Primary Examiner* — Thomas C Diaz
(74) *Attorney, Agent, or Firm* — Osha Bergman Watanabe & Burton LLP

(57) ABSTRACT

A method for attaching a plastic barrel configured to guide an output shaft of a mechanical device to a housing for the mechanical device is disclosed. The housing includes a chimney delimited by an upper edge and a base, the chimney being arranged to partially surround the output shaft, the plastic barrel having a lateral protuberance. The method involves at least the following steps: inserting a first end of the plastic barrel into the chimney of the housing until the lateral protuberance axially abuts against the upper edge of
(Continued)

Figure 1:
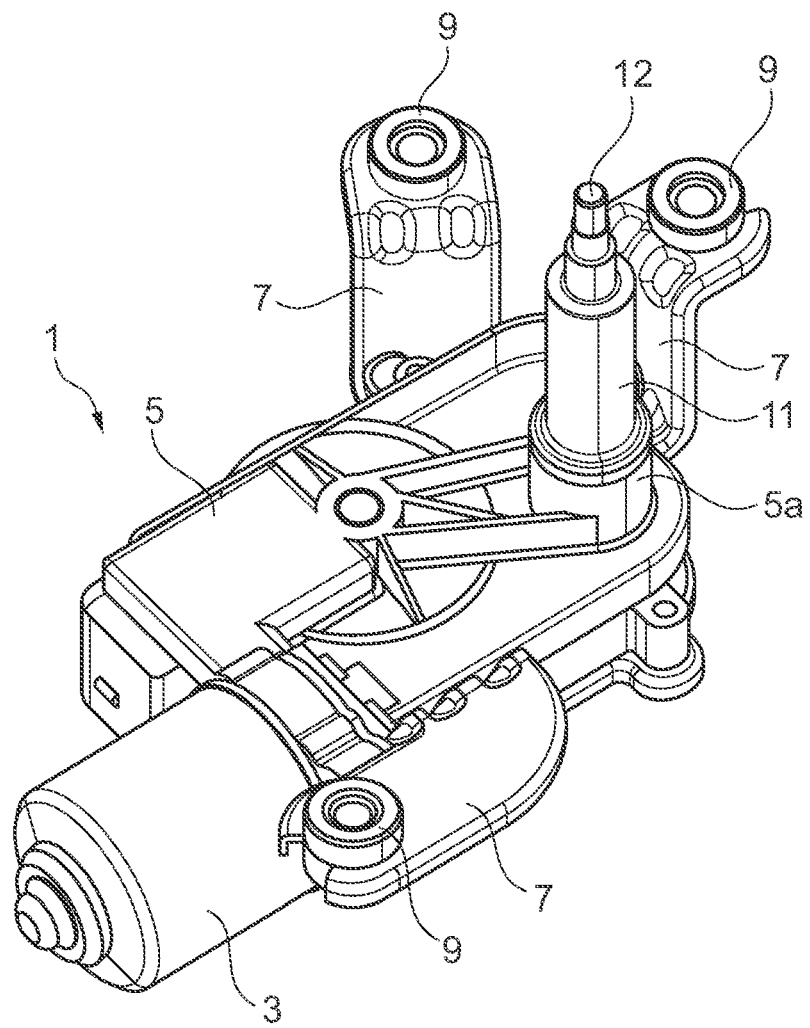

the chimney, and at least partially deforming the first end of the plastic barrel in order to form an axial counter-abutment.

14 Claims, 7 Drawing Sheets

(51) Int. Cl.
*B60S 1/26* (2006.01)
*F16H 57/02* (2012.01)

(52) U.S. Cl.
CPC .............. *F16H 2057/02017* (2013.01); *F16H 2057/02034* (2013.01); *F16H 2057/02082* (2013.01)

(56) References Cited

U.S. PATENT DOCUMENTS

| | | | |
|---|---|---|---|
| 8,448,289 | B2 | 5/2013 | Reith et al. |
| 9,182,020 | B2 * | 11/2015 | Tokizaki ................... B60S 1/08 |
| 10,960,853 | B2 * | 3/2021 | Kapitza ................. B60S 1/3493 |
| 2009/0052821 | A1 * | 2/2009 | Hartmann ............... F16C 23/10 384/295 |
| 2014/0368072 | A1 * | 12/2014 | Heuberger ........... H02K 7/1166 310/83 |

FOREIGN PATENT DOCUMENTS

| | | | |
|---|---|---|---|
| EP | 2147837 A1 * | 1/2010 | .............. B60S 1/166 |
| EP | 3025913 A1 | 6/2016 | |
| EP | 3333025 A1 | 6/2018 | |
| FR | 1319123 A | 2/1963 | |
| FR | 3007359 A1 | 12/2014 | |
| JP | 2015-016805 A | 1/2015 | |
| JP | 2018-537358 A | 12/2018 | |

OTHER PUBLICATIONS

Office Action Issued in Corresponding JP Application No. 2022-562400, dated Oct. 13, 2023. (8 Pages including English Translation).

* cited by examiner

HOUSING FOR MECHANICAL DEVICE, MECHANICAL ASSEMBLY, GEAR MOTOR AND ASSOCIATED ATTACHMENT METHOD

The present invention relates to a metal housing for a mechanical device comprising an output shaft and an assembly of a plastic barrel on the metal housing. The metal housing corresponds, for example, to a housing for a gear motor, in particular of a motor vehicle wiper device.

The output shafts of gear motors of wiper systems, in particular for the rear windows of motor vehicles, generally comprise an output shaft that is relatively long in order to allow them to pass through the bodywork. It is therefore necessary to use a barrel for guiding the shaft which is attached to the housing of the gear motor containing the reduction gear mechanism.

The prior art discloses such barrels, but these components are generally expensive and/or difficult to manufacture or to attach to the housing of the gear motor.

A need therefore exists for a solution in order to obtain a barrel that is inexpensive and easy to attach to the housing. Moreover, the assembly of the barrel and the housing must be such that no dirt or moisture can enter the housing, in order to preserve the service life of the reduction gear mechanism.

To this end, the present invention relates to a method for attaching a plastic barrel intended to guide an output shaft of a mechanical device to a housing for said mechanical device, said housing comprising a chimney delimited by an upper edge and a base, said chimney being arranged to partially surround the output shaft, the plastic barrel comprising a lateral protuberance, the method comprising at least the following steps:

inserting a first end of the plastic barrel into the chimney of the housing until the lateral protuberance axially abuts against the upper edge of the chimney, at least partially deforming the first end of the plastic barrel in order to form an axial counter-abutment.

According to another aspect of the present invention, the housing is, for example, a metal housing or a plastic housing whose hardness may be different from the hardness of the plastic of the barrel.

According to another aspect of the present invention, the base of the chimney is at least partially flared towards the inside of the housing and the deformation step comprises flaring the first end of the plastic barrel by plastic deformation.

According to another aspect of the present invention, the deformation step comprises a heating step.

According to another aspect of the present invention, the heating temperature is between 150 and 180°.

According to another aspect of the present invention, the deformation step comprises a step of applying ultrasound.

According to another aspect of the present invention, the plastic barrel is made from polyamide which may be filled, i.e., reinforced with glass fiber, for example.

According to another aspect of the present invention, the chimney of the housing comprises at least one recess and the deformation step comprises deforming the plastic barrel into said at least one recess in order to form an anti-rotation lug.

According to another aspect of the present invention, the mechanical device is a gear motor of a wiper device.

The present invention also relates to a housing for a mechanical device comprising a chimney configured to at least partially surround an output shaft of the mechanical device, the chimney comprising a base with a substantially conical inner shape flared towards the inside of said housing.

According to another aspect of the present invention, the housing is a metal housing.

According to another aspect of the present invention, at least one recess is provided in the base of the chimney in order to receive an anti-rotation lug.

The present invention also relates to an assembly of a housing as previously described and a plastic barrel, the plastic barrel comprising a lateral protuberance forming an abutment and delimiting a first end intended to be inserted into the chimney of the housing around the output shaft.

According to another aspect of the present invention, the lateral protuberance is flange-shaped.

According to another aspect of the present invention, the flange comprises an end part curved towards the first end.

According to another aspect of the present invention, the flange forms a water deflector in order to prevent droplets from entering the housing.

According to another aspect of the present invention, the chimney comprises an at least partially annular mating shape configured to cooperate with the lateral protuberance.

According to another aspect of the present invention, the first end of the plastic barrel is flared to cooperate with the flared base of the chimney.

According to another aspect of the present invention, the first end of the plastic barrel is deformed in order to enter the recess and form an anti-rotation lug.

The present invention also relates to a gear motor comprising an electric motor, a reduction gear comprising an output shaft, a housing as previously described at least partially containing the electric motor and the reduction gear and a plastic barrel forming an assembly with the housing as previously described.

Figure 2:
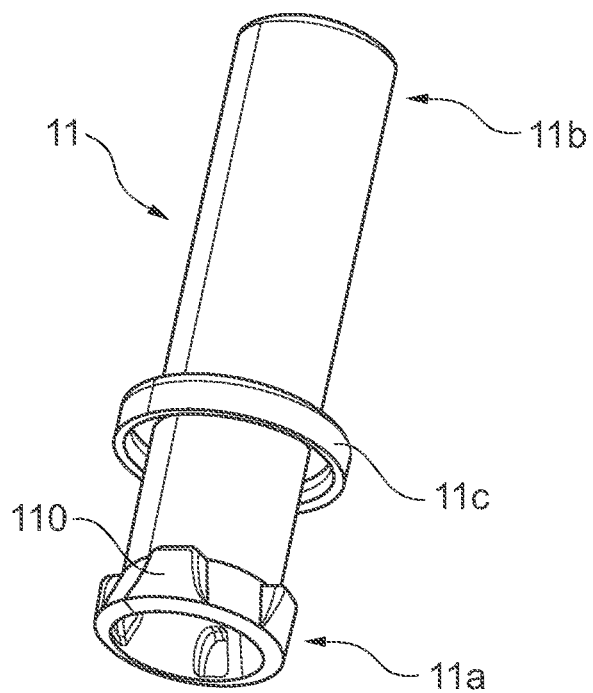
Figure 3:
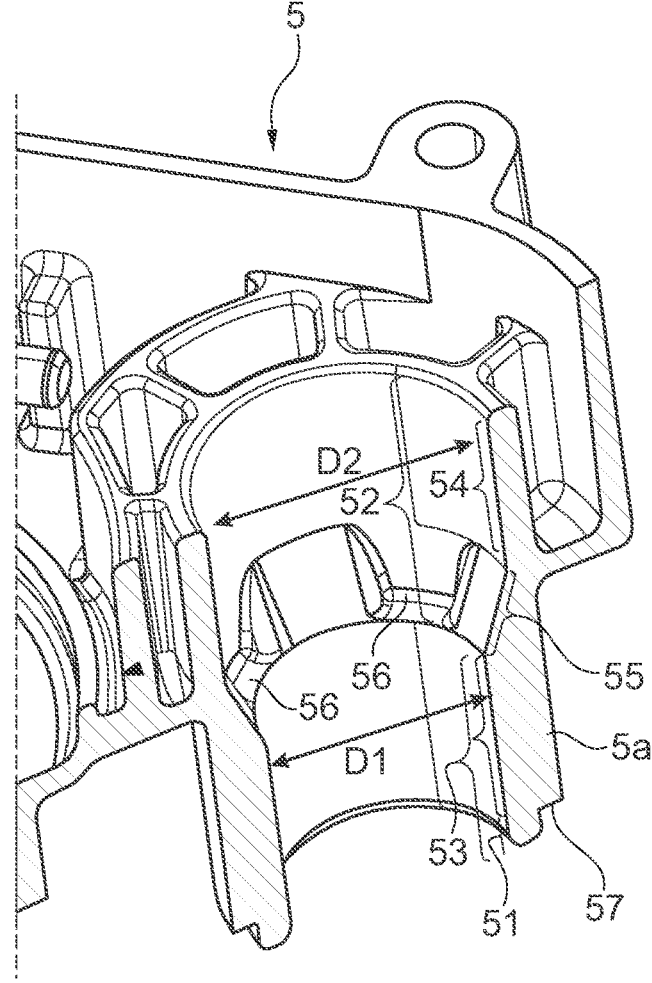
Figure 4:
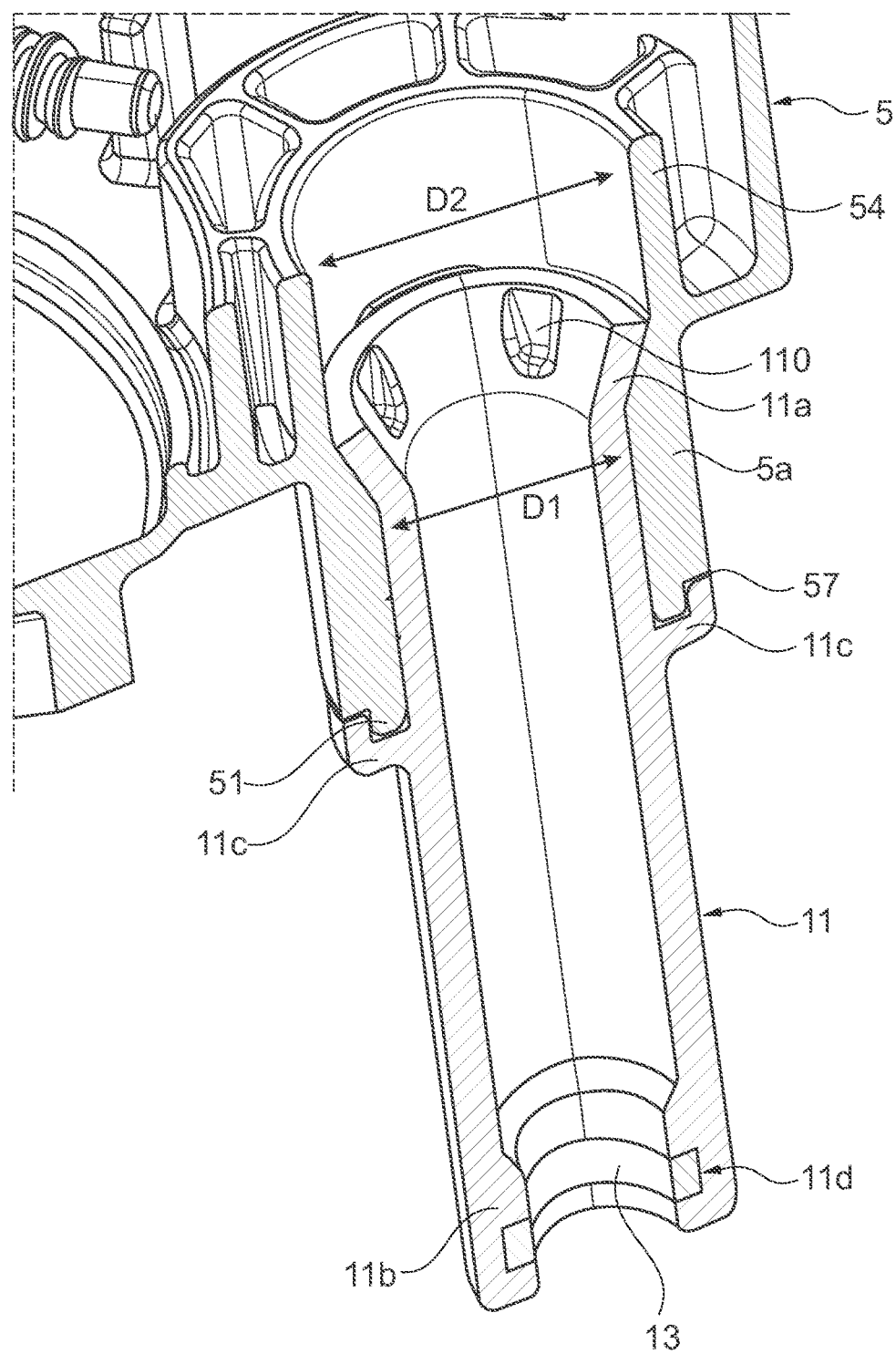
Figure 5:
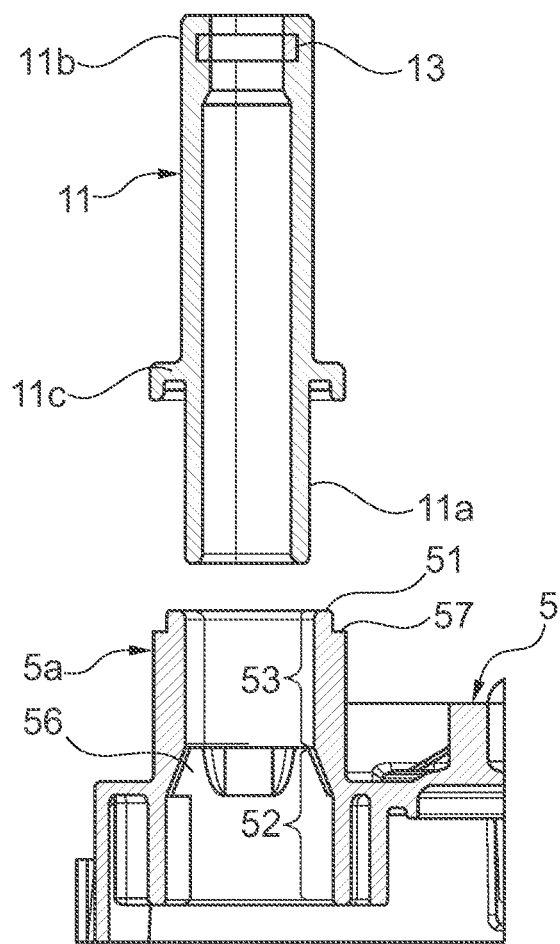
Figure 6:
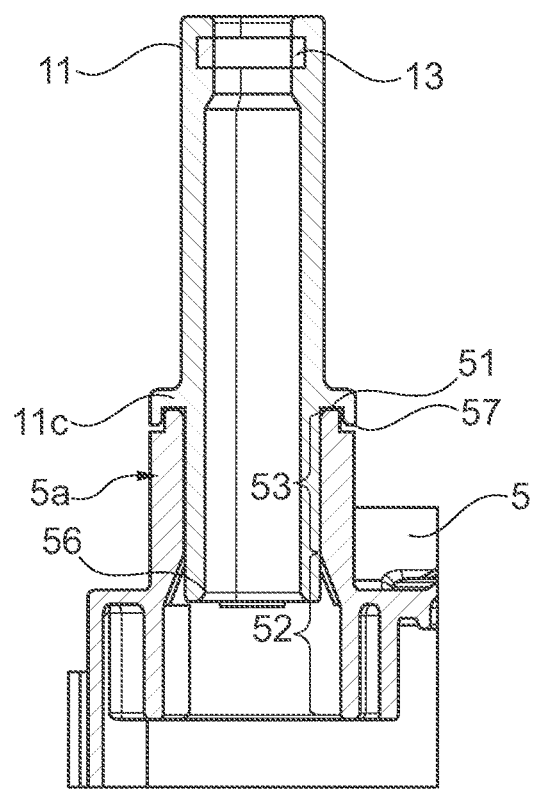
Figure 7:
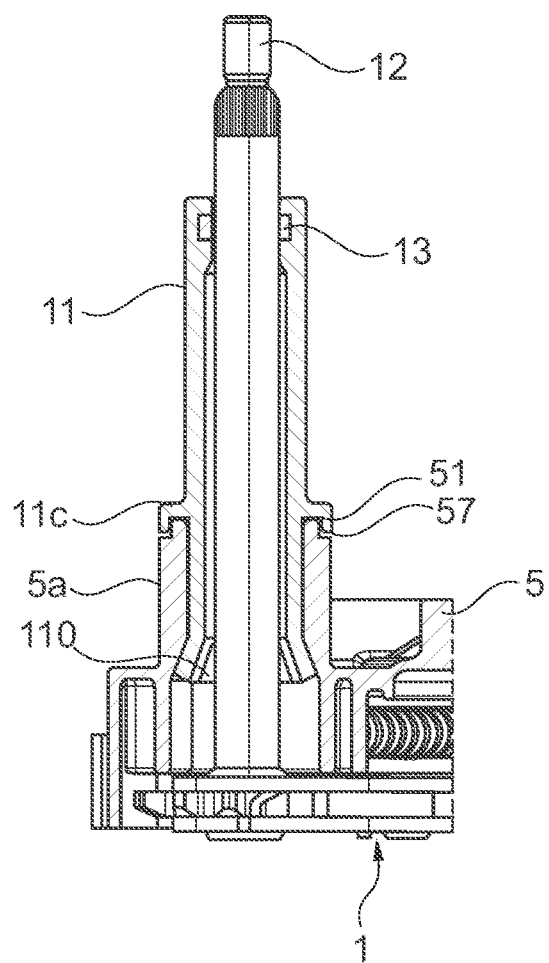
Figure 8:
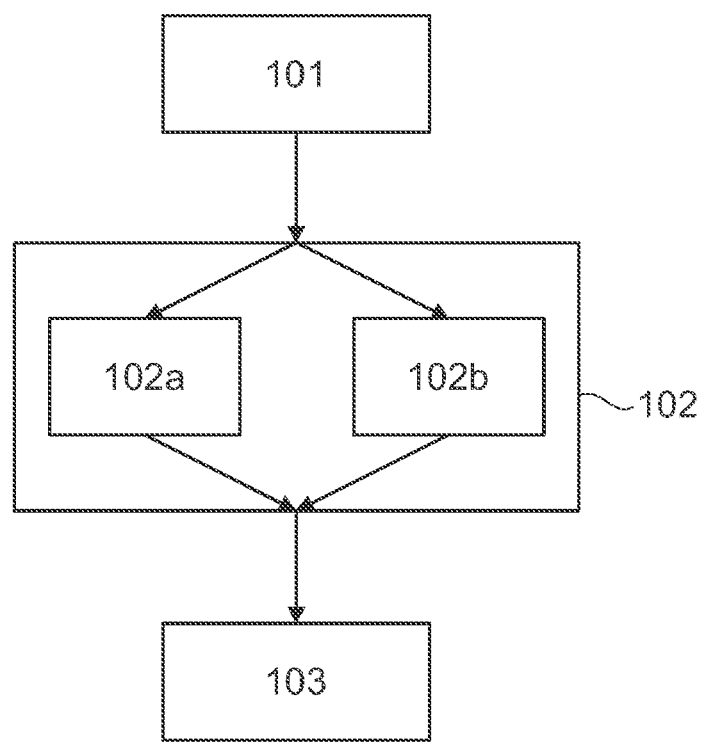

Other features and advantages of the invention will emerge from the following description, given by way of non-limiting example, with reference to the appended drawings, in which:

FIG. 1 shows a schematic perspective view of a gear motor according to the present invention, FIG. 2 shows a schematic perspective view of a barrel according to the present invention, FIG. 3 shows a schematic perspective cross-sectional view of part of a housing for a gear motor according to the present invention, FIG. 4 shows a schematic perspective cross-sectional view of an assembly comprising a housing for a gear motor and a barrel according to the present invention, FIGS. 5, 6 and 7 show schematic perspective cross-sectional views of various assembly steps according to the present invention, FIG. 8 shows a flowchart of the various steps of assembling the barrel on the housing according to the present invention.

In all of the figures, elements that are identical bear the same reference numbers.

The following embodiments are examples. Although the description refers to one or more embodiments, this does not necessarily mean that each reference relates to the same embodiment, or that the features apply only to one embodiment. Individual features of different embodiments may also be combined or interchanged to provide other embodiments.

FIG. 1 shows a perspective diagram of a gear motor 1 intended for a wiper device for the rear window of a motor vehicle.

The gear motor 1 comprises an electric motor 3 and a reduction gear mechanism (not shown) arranged in a housing 5 and connected to the electric motor 3. The housing 5 is, for example, a metal housing or a plastic housing and may comprise attachment tabs 7 for attaching to a bodywork element, for example. Silent blocks 9 may be arranged at the attachment tabs 7 for vibration and acoustic decoupling from the bodywork element.

The gear motor 1 also comprises a barrel 11 made from plastic material intended to guide an output shaft 12 of the gear motor 1. The plastic barrel 11 is, for example, made from polyamide which may or may not be filled, i.e., reinforced with glass fiber in particular or any other type of fiber helping reinforce the polyamide. In the case of a housing made from plastic material, the material of the housing and of the barrel may be different and the hardnesses of the two materials may be different.

FIG. 2 shows the barrel 11 alone. The barrel 11 has a cylindrical general shape and comprises a first end 11a referred to as the inner end intended to be inserted into the housing 5 at a chimney 5a of the housing 5 and a second end 11b. The barrel 11 also comprises a lateral protuberance 11c which delimits the part of the barrel intended to be inserted into the chimney 5a of the housing 5. The lateral protuberance 11c has the general shape of a flange. The flange may be curved with a first portion which extends in an annular manner around the cylinder followed by a second portion which extends parallel to the barrel 11 towards the first end 11a, the first and the second portion being connected by a bent intermediate portion.

The first end 11a is intended to be deformed after being inserted into the chimney 5a of the housing 5 in order to attach the barrel 11 to the housing 5. FIG. 2 therefore shows the barrel 11 after it has been deformed. Before being inserted into the chimney 5a of the housing 5, the first end 11a has a cylindrical shape (see FIG. 5).

As shown in FIG. 3, the chimney 5a extends between an upper edge or end portion 51 and a base 52. The upper edge 51 is carried by a cylindrical portion 53 with a first diameter D1. The base 52 comprises a proximal portion 54 with a second diameter D2 greater than the first diameter D1 and a flared intermediate portion 55 intended to receive the end 11a of the barrel. The upper edge 51 comprises, for example, a circumferential material recess 57 intended to receive the second portion of the lateral protuberance 11c and forming an annular mating shape. The flared intermediate portion 55 may also comprise once or more recesses 56, for example three, provided on a portion of the inner circumference of the chimney 5a and intended to receive anti-rotation lugs 110. The recesses 56 may be distributed at regular intervals around the perimeter of the chimney 5a. Indeed, as will be better described hereinafter in the description, the barrel 11 is intended to be deformed after being inserted into the chimney 5a so that the presence of one or more recesses 56 causes the first end 11a of the barrel 11 to be deformed in an irregular manner around its circumference, resulting in the formation of one or more anti-rotation lugs 110 at the recess or recesses 56, thus preventing any rotational movement of the barrel 11 in relation to the chimney 5a. The fact that the chimney 5a is flared helps prevent the barrel 11 from moving in translation by creating a counter-abutment, the abutment being created by the lateral protuberance 11c being brought into contact with the upper edge 51 of the chimney 5a.

FIG. 4 shows the barrel 11 in the assembled state in the chimney 5a of the housing 5 after deformation of the first end 11a of the barrel 11 in order to form an assembly between the housing 5 and the barrel 11. The lateral protuberance 11c bears on the upper edge 51 of the chimney 5a and engages in a form-fitting manner around the circumferential material recess 57 provided on the upper edge 51 of the chimney 5a of the housing 5. The circumferential material recess 57 therefore acts as a mating shape for the lateral protuberance 11c of the barrel. Thus, by covering the upper edge 51 of the chimney 5a, the lateral protuberance 11c forms a moisture deflector preventing drops of water from entering at the connection between the barrel 11 and the housing 5, helping to protect the inside of the housing 5 and in particular the reduction gear mechanism.

The first end 11a of the barrel 11 is in contact with the flared intermediate portion of the chimney and is therefore also flared. Moreover, the portions of the first end 11a facing the recesses 56 are deformed so as to be inserted at least partially into said recesses 56 and form anti-rotation lugs 110.

Moreover, the second end 11b of the barrel 11 may comprise an inner portion that is narrower in order to better guide the output shaft 12 of the gear motor 1. Furthermore, at the inner portion of its second end 11b, the barrel 11 may comprise a groove 11d intended to receive a seal 13, for example an O-ring seal or an overmolded seal, in order to ensure tight sealing between the barrel 11 and the output shaft of gear motor 1.

Therefore, in the assembled state, the chimney 5a partially surrounds the barrel 11, i.e., from the first end 11a up to the lateral protuberance 11c of the barrel 11.

The various steps of the method allowing the plastic barrel 11 to be assembled on and attached to the housing 5 will now be described with reference to FIGS. 5 to 7 and the flowchart of FIG. 8.

The first step 101 relates to the insertion of the first end 11a of the plastic barrel 11 into the chimney 5a of the housing 5, as shown by the arrow in FIG. 5. Insertion continues until the lateral protuberance 11c comes into contact with the end of the chimney, as shown in FIG. 6. The lateral protuberance 11c is positioned in such a way that the first end 11a of the plastic barrel 11 is situated opposite the flared intermediate portion 55 of the chimney 5a when the lateral protuberance is in contact with the upper edge 51 of the chimney 5a.

The second step 102 relates to the plastic deformation of the first end 11a of the plastic barrel 11. This deformation corresponds, for example, to flaring the first end against the flared intermediate portion 55 of the chimney 5a in order to form an axial counter-abutment and prevent any translational movement of the plastic barrel 11 in relation to the chimney 5a, the abutment being formed by the lateral protuberance 11c bearing on the upper edge 51 of the chimney 5a.

According to a first alternative 102a, the plastic deformation is carried out by virtue of a step of heating the first end 11a of the plastic barrel 11. In the case of a plastic barrel 11 made from polyamide (which may or may not be filled), the heating temperature is, for example, between 150 and 180° C. The deformation may be formed by a conical or substantially conical element inserted from inside the housing 5 into the first end 11a of the plastic barrel 11. Pressure is applied to the conical element towards the second end 11b of the plastic barrel 11 while the plastic barrel 11 is held in position (the lateral protuberance 11c being in contact with the upper edge 51) in the housing 5, resulting in the flaring of the first end of the plastic barrel 11. In the event that the chimney 5a comprises recesses 56, the conical element may comprise shapes complementary to the recesses 56, such that the plastic barrel 11 is deformed so as to fit into the recesses 56 and form anti-rotation lugs 110.

According to a second alternative 102b, the plastic deformation of the first end 11a of the plastic barrel 11 is achieved by virtue of a step of applying ultrasound, for example via a sonotrode probe. Applying ultrasound helps locally heat the first end 11a of the plastic barrel 11, thus making plastic deformation possible. A conical or substantially conical element similar to the conical element of alternative 102a may be used to flare the first end 11a against the flared intermediate portion 55 of the chimney 5a of the housing 5. Once the first end 11a of the plastic barrel is flared, the plastic barrel is attached to the housing and forms an assembly.

Step 203 consists in positioning the mechanical device, for example a gear motor 1, in the housing 5, and the output shaft 12 of the mechanical device 1 in the plastic barrel 11, as shown in FIG. 7.

The present invention is not limited to a gear motor 1 of a wiper device for the rear window of a motor vehicle but also extends to other types of mechanical devices comprising an output shaft, a housing and a plastic barrel for guiding the output shaft attached to the housing.

Therefore, using a plastic barrel 11 makes it possible to perform the function of guiding the output shaft 12 while limiting the weight and the cost of the barrel 11. Moreover, the attachment of the plastic barrel 11 to the housing 5, which may be made from a different material from the barrel 11, for example metal, is simple and quick and also helps to limit the risk of moisture entering the housing 5 and therefore to protect the mechanism of the gear motor 1.

The invention claimed is:

1. A method for attaching a plastic barrel configured to guide an output shaft of a mechanical device to a housing of said mechanical device, said housing comprising a chimney delimited by an upper edge and a base, said chimney being arranged to partially surround the output shaft, the plastic barrel comprising a lateral protuberance, the method comprising:
   inserting a first end of the plastic barrel into the chimney of the housing until the lateral protuberance-axially abuts against the upper edge of the chimney; and
   at least partially deforming the first end of the plastic barrel in order to form an axial counter-abutment.

2. The method as claimed in claim 1, wherein the base of the chimney is at least partially flared towards the inside of the housing and the at least partial deformation comprises flaring the first end of the plastic barrel by plastic deformation.

3. The method as claimed in claim 1, wherein the at least partial deformation comprises heating or applying ultrasound.

4. The method as claimed in claim 3, wherein the at least partial deformation comprises heating, and the heating temperature is between 150 and 180°.

5. The method as claimed in claim 1, wherein the plastic barrel is made of polyamide.

6. The method as claimed in claim 1, wherein the chimney of the housing comprises at least one recess and the deformation step comprises deforming the plastic barrel into said at least one recess in order to form an anti-rotation lug.

7. The method as claimed in claim 1, wherein the mechanical device is a gear motor of a wiper device.

8. An assembly of a housing for a mechanical device comprising:
   a chimney configured to at least partially surround an output shaft of the mechanical device, wherein the chimney comprises a base comprising a substantially conical inner shape flared towards the inside of said housing: and
   a plastic barrel comprising a lateral protuberance forming an abutment and delimiting a first end,
   wherein the first end is inserted into the chimney of the housing around the output shaft of the mechanical device, and
   wherein the first end is deformed to form an axial counter abutment.

9. The housing as claimed in claim 8, wherein at least one recess is provided in the base of the chimney of the housing in order to receive an anti-rotation lug.

10. The assembly as claimed in claim 8, wherein the lateral protuberance of the plastic barrel is a flange-shaped lateral protuberance.

11. The assembly as claimed in claim 10, wherein the flange-shaped lateral protuberance comprises a portion curved towards the first end of the plastic barrel.

12. The assembly as claimed in claim 8, wherein the chimney comprises an at least partially annular mating shape configured to axially abut against the lateral protuberance.

13. The assembly as claimed in claim 8, wherein the first end of the plastic barrel is flared to fit with a flared base of the chimney.

14. A gear motor comprising:
   an electric motor;
   a reduction gear comprising an output shaft; and
   a housing as claimed in claim 8 at least partially containing the electric motor,
   wherein the reduction gear and a plastic barrel form an assembly with the housing.

* * * * *